(12) United States Patent
Maruyama et al.

(10) Patent No.: US 8,528,104 B2
(45) Date of Patent: *Sep. 3, 2013

(54) SECURITY AND TICKETING SYSTEM CONTROL AND MANAGEMENT

(75) Inventors: Hiroshi Maruyama, Tokyo (JP); Seiji Munetoh, Kanagawa-Ken (JP); Sachiko Yoshihama, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/086,781

(22) Filed: Apr. 14, 2011

(65) Prior Publication Data

US 2011/0197283 A1    Aug. 11, 2011

Related U.S. Application Data

(63) Continuation of application No. 12/140,084, filed on Jun. 16, 2008, now Pat. No. 7,953,977, which is a continuation of application No. 11/078,767, filed on Mar. 11, 2005, now abandoned.

(30) Foreign Application Priority Data

Mar. 12, 2004  (JP) ................. 2004-070798

(51) Int. Cl.
    *H04L 29/06*    (2006.01)
(52) U.S. Cl.
    USPC ............. 726/27; 726/22; 726/34; 713/176; 713/175; 713/153; 713/189; 713/170

(58) Field of Classification Search
    USPC ............. 726/26, 27, 22, 34; 713/176, 175, 713/153, 189, 170
    See application file for complete search history.

(56) References Cited

U.S. PATENT DOCUMENTS

| | | | | |
|---|---|---|---|---|
| 4,868,877 | A | * | 9/1989 | Fischer .................. 713/157 |
| 5,005,200 | A | * | 4/1991 | Fischer .................. 380/30 |
| 5,774,550 | A | * | 6/1998 | Brinkmeyer et al. ....... 713/168 |

(Continued)

FOREIGN PATENT DOCUMENTS

| | | |
|---|---|---|
| JP | 2000510254 | 8/2000 |
| JP | 2002183633 | 6/2002 |

(Continued)

OTHER PUBLICATIONS

Terada et al., "Copy Prevention Scheme for Rights Trading Infrastructure," Journal of Information Processing Society of Japan, vol. 42, No. 8, Aug. 2001, pp. 1-20.

*Primary Examiner* — David García Cervetti
(74) *Attorney, Agent, or Firm* — Shimokaji & Associates, PC

(57) ABSTRACT

A security device of this invention includes a nonvolatile storage unit 22 for storing a validity check unit including a counter updated every time signature function means 30 is called up, a volatile storage unit 24 for reading and storing a counter array out of an external nonvolatile storage unit storing the counter array, in which the counter array is obtained by coupling a hash value generated for each signature key with a signature number counter for counting the number of signatures performed by use of the signature key, and a hash function unit 28 for reading the counter array out of the volatile storage unit 24, generating the hash value, and transferring the hash value to the validity check unit for a validity check.

20 Claims, 11 Drawing Sheets

| PROCESSING | INPUT | OUTPUT | EXPLANATION OF PROCESSING |
|---|---|---|---|
| genkey | keyid, n, CA | keyBlob, pubkey(Kv) | GENERATE KEY PAIR (PRIVATE KEY, PUBLIC KEY). INCREMENT CA WHEN keyid = n. CLEAR SIGNATURE NUMBER COUNTER FOR KEY, AND SEND BACK KEYS Blob OF PRIVATE KEY AND PUBLIC KEY |
| delkey | keyid, n, CA | none | DELETE KEY AND SET SIGNATURE NUMBER COUNTER TO -1, FOR |
| sign | keyid, keyBlob, n, CA, message | signature | SIGN CURRENT VALUE IN SIGNATURE NUMBER COUNTER TOGETHER WITH MESSAGE m AND INCREMENT SIGNATURE NUMBER COUNTER BY 1. WHEN SIGNATURE NUMBER COUNTER OVERFLOWS, SIGNATURE NUMBER COUNTER IS SET TO -1 AND SIGNATURE VALUE IS RETURNED. |

(56) References Cited

U.S. PATENT DOCUMENTS

| | | | |
|---|---|---|---|
| 5,930,363 A * | 7/1999 | Stanford et al. | 705/65 |
| 6,064,297 A * | 5/2000 | Odinak et al. | 340/12.33 |
| 6,067,621 A | 5/2000 | Yu et al. | 713/172 |
| 6,301,660 B1 * | 10/2001 | Benson | 713/165 |
| 6,334,118 B1 * | 12/2001 | Benson | 705/52 |
| 6,690,289 B1 * | 2/2004 | Odinak et al. | 340/9.11 |
| 6,738,762 B1 * | 5/2004 | Chen et al. | 707/719 |
| 7,096,365 B1 * | 8/2006 | Hamann et al. | 713/180 |
| 7,207,060 B2 * | 4/2007 | Immonen et al. | 726/10 |
| 7,249,258 B2 * | 7/2007 | Honda et al. | 713/176 |
| 7,373,509 B2 * | 5/2008 | Aissi et al. | 713/168 |
| 7,492,878 B2 * | 2/2009 | Dupre et al. | 379/114.01 |
| 7,496,604 B2 * | 2/2009 | Sutton et al. | 1/1 |
| 7,552,322 B2 * | 6/2009 | Balfanz et al. | 713/159 |
| 7,721,108 B2 * | 5/2010 | Pailles et al. | 713/185 |
| 7,730,314 B2 * | 6/2010 | Kim | 713/176 |
| 7,870,089 B1 * | 1/2011 | Hall et al. | 707/694 |
| 7,917,764 B2 * | 3/2011 | Futa et al. | 713/176 |
| 2002/0038429 A1 | 3/2002 | Smeets | |
| 2002/0043566 A1 * | 4/2002 | Goodman et al. | 235/492 |
| 2002/0062438 A1 * | 5/2002 | Asay et al. | 713/157 |
| 2003/0105954 A1 * | 6/2003 | Immonen et al. | 713/156 |
| 2004/0006692 A1 * | 1/2004 | Honda et al. | 713/157 |
| 2004/0054901 A1 * | 3/2004 | England et al. | 713/168 |
| 2004/0196981 A1 * | 10/2004 | Nakano et al. | 380/280 |
| 2004/0236819 A1 * | 11/2004 | Anati et al. | 709/200 |
| 2004/0267668 A1 * | 12/2004 | Aissi | 705/50 |
| 2005/0149730 A1 * | 7/2005 | Aissi et al. | 713/168 |
| 2005/0154896 A1 | 7/2005 | Widman et al. | |
| 2005/0160046 A1 * | 7/2005 | Dupre et al. | 705/52 |
| 2006/0168447 A1 * | 7/2006 | Pailles et al. | 713/176 |
| 2006/0236400 A1 * | 10/2006 | Gudmundsson | 726/25 |
| 2007/0168291 A1 * | 7/2007 | Landrock | 705/51 |
| 2008/0133938 A1 * | 6/2008 | Kocher et al. | 713/193 |
| 2008/0222418 A1 * | 9/2008 | Futa et al. | 713/176 |
| 2009/0006868 A1 * | 1/2009 | Alkove et al. | 713/193 |
| 2011/0255690 A1 * | 10/2011 | Kocher et al. | 380/210 |
| 2011/0264923 A1 * | 10/2011 | Kocher et al. | 713/189 |

FOREIGN PATENT DOCUMENTS

| | | |
|---|---|---|
| JP | 2002244554 | 8/2002 |
| JP | 2002-304589 | 10/2002 |
| JP | 2005509231 | 4/2005 |
| JP | 2005529547 | 9/2005 |

* cited by examiner

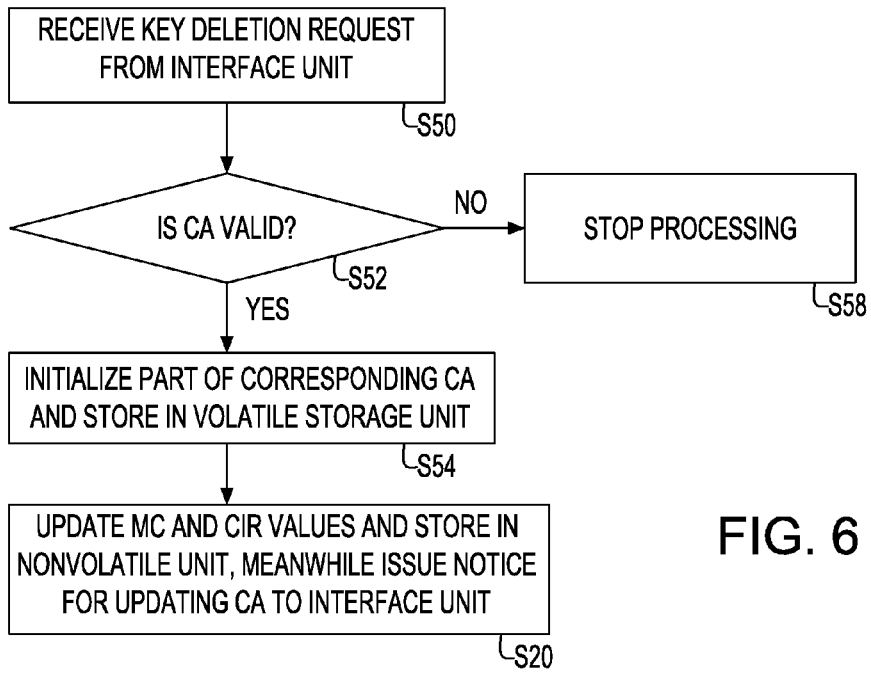

FIG. 6

| PROCESSING | INPUT | OUTPUT | EXPLANATION OF PROCESSING |
|---|---|---|---|
| genkey | keyid, n, CA | keyBlob, pubkey(Kv) | GENERATE KEY PAIR (PRIVATE KEY, PUBLIC KEY). INCREMENT CA WHEN keyId = n. CLEAR SIGNATURE NUMBER COUNTER FOR KEY, AND SEND BACK KEYS Blob OF PRIVATE KEY AND PUBLIC KEY |
| delkey | keyid, n, CA | none | DELETE KEY AND SET SIGNATURE NUMBER COUNTER TO -1, FOR |
| sign | keyid, keyBlob, n, CA, message | signature | SIGN CURRENT VALUE IN SIGNATURE NUMBER COUNTER TOGETHER WITH MESSAGE m AND INCREMENT SIGNATURE NUMBER COUNTER BY 1. WHEN SIGNATURE NUMBER COUNTER OVERFLOWS, SIGNATURE NUMBER COUNTER IS SET TO -1 AND SIGNATURE VALUE IS RETURNED. |

FIG. 7

| PROCESSING | INPUT | OUTPUT | EXPLANATION OF PROCESSING |
|---|---|---|---|
| genkey | NONE | M[Kv] | GENERATE KEY PAIR (PRIVATE KEY, PUBLIC KEY). CLEAR USE COUNTER FOR KEY, AND SIGN PUBLIC KEY USING MASTER KEY |
| delkey | NONE | none | DELETE Ks |
| sign | message (m) | Ks[m+C] | SIGN A CONCATENATION OF MESSAGE m AND NUMBER COUNTER C USING Ks (PRIVATE KEY), AND INCREMENT NUMBER COUNTER C BY 1. WHEN C = Cmax, CALL AND EXECUTE delkey. |

FIG. 11

SECURITY AND TICKETING SYSTEM CONTROL AND MANAGEMENT

FIELD OF THE INVENTION

The present invention generally relates to prevention of fraudulent uses of digital tickets, or more specifically to a security device and an information processing device for performing security control and management of digital tickets.

BACKGROUND OF THE INVENTION

Along with diffusion of information processing devices such as personal computers, PDAs, cellular phones, and the like in recent years, it is conceivable that a technique for providing a service by use of a so-called digital ticket (hereinafter referred simply to as a ticket in the present invention) will become widespread. Such a ticket allows fraudulent duplication because of the nature of electronic data. Accordingly, it is conceivable to be increasingly necessary to prevent acts of performing multiple accesses by use of a fraudulently duplicated ticket (hereinafter referred to as multiple uses).

Although such fraudulent acts must be eliminated, the ticket in the present invention is a piece of electronic data, and it is difficult to prevent the multiple uses of the duplicated ticket only by means of a software unit.

Therefore, it is understood that elimination of the above-described fraudulent acts must depend on hardware to some extent. However, a security device implemented in hardware has a limitation in hardware resources allocatable for this purpose. For this reason, with regard to conventionally used security devices, it is also conceivable that data for preventing the fraudulent acts must be stored in an area outside the security device. In this case, it is possible to execute complicated encryption processing between the security device and the external area. However, such processing may cause response delays in transactions and may damage efficiency of using electronic tickets. On the other hand, a method of storing the data for preventing fraudulent acts in the external area has a disadvantage of damaging reliability of the security device itself due to fraudulent accesses to the data for preventing the fraudulent acts.

A method of storing an encryption key in an encrypted format outside the security device has been heretofore known. However, it is hard to say that the method sufficiently addresses a question of restricting the number of signatures, i.e. restricting the multiple uses. In this case, it is also conceivable to add a counter to a key Blob. However, reliability of the counter must be assured at the same time. Accordingly, adoption of a data format in which the counter is simply added is not sufficient in terms of eliminating the fraudulent multiple uses.

The following document is considered:
[Non-Patent Document 1]
Terada et al., "Copy Prevention Scheme for Rights Trading Infrastructure", Journal of Information Processing Society of Japan, Vol. 42, No. 8, August 2001, pp. 2017-2029

Meanwhile, there has been disclosed a technique configured to delete a token representing a ticket from hardware after use, (See non-patent document 1). In this case, it is essential to validate whether this token is reliable. Accordingly, a key issued by a certificate site should be retained in the hardware. However, to assure safe storage of this key involves additional complexity and a new threat to reliability.

In other words, it has been heretofore deemed necessary to impart highly reliable number identification capability to data such as digital tickets which require prevention of fraudulent uses. Moreover, it has been deemed necessary to prevent fraudulent uses of data such as tickets with high reliability only by adding minimum hardware resources.

SUMMARY OF THE INVENTION

The present invention provides a security device configured with a validity check unit which includes a counter (a master counter: MC) updated every time a signature processing step is executed, and a counter array resister (CIR) for storing a hash value calculated from a counter array stored outside and a value in the above-described MC.

The present invention also provides an information processing device for restricting multiple uses of signed data. A device includes: the above-described security device; and an interface unit including a nonvolatile storage unit for storing a counter array configured to couple a hash value generated for each signature key with a signature number counter for counting the number of signatures performed by use of the signature key.

The present invention also provides a controlling method for controlling a security device for restricting multiple uses of signed data. The controlling method may further cause the security device to execute the step of storing the immediately preceding hash value among the hash values generated in the past and sent from the counter array. Moreover, in the present invention, the controlling method may further cause the security device to execute the step of allowing the hash function unit to read a value in the counter and to calculate the hash value which is a concatenated value obtained by coupling the counter value with a value in the counter array.

The present invention also provides a ticketing system using a digital ticket. The system includes: a ticket issuer terminal for issuing a ticket; the information processing device for storing the issued ticket; a network for interconnecting the ticket issuer terminal and the information processing device; and a service terminal for issuing a ticket use request to the information processing device. The information processing device may obtain and store the ticket from another information processing device and access the service terminal.

BRIEF DESCRIPTION OF THE DRAWINGS

For a more complete understanding of the present invention and the advantage thereof, reference is now made to the following description taken in conjunction with the accompanying drawings.

FIG. 6 is a flowchart showing "delkey" processing for deleting an entry.

FIG. 7 is a view showing inputs, outputs and the processing of the microcodes for executing the respective processing for genkey, delkey, and sign.

FIG. 11 is a view showing a summary of the processing and parameters used by the security device included in the user terminal used in the ticketing system of the present invention.

DETAILED DESCRIPTION OF THE INVENTION

Figure 1:
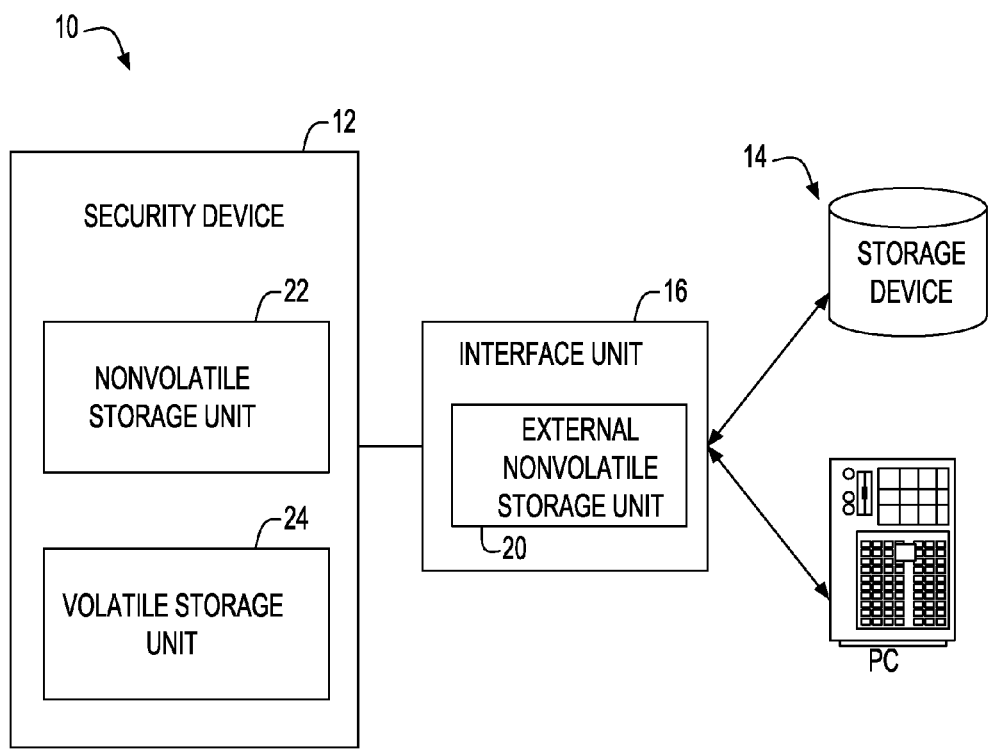
FIG. 1 is a view showing a schematic configuration of an information processing system including a security device of the present invention.

The present invention is based on a concept that it is possible to realize a security device, which can count the number of signatures highly reliably, by applying a digital signature technique to the data, which must be prevented from being fraudulently used. Fraudulent uses of data can be prevented effectively and highly reliably with minimum hardware resources. In this invention, a security device is configured with a validity check unit which includes a counter (a master counter: MC) updated every time a signature processing is executed, and a counter array resister (CIR) for storing a hash value calculated from a counter array stored outside and a value in the above-described MC.

The validity check unit generates a hash value which is a concatenated value obtained by concatenating a value in the counter array (CA) read out of external nonvolatile storage means with the newest MC value. This hash value is compared with the value stored in the CIR. If these values are not identical to each other, it is apparent that the CA is changed irrespective of the signature processing. Accordingly, if the hash value and the CIR value are not identical to each other, the security device will not issue an instruction for calling up signature function means and processing through a digital signature will be stopped inside the security device, thereby preventing a fraudulent use. In addition, the CA value can be read out of the external nonvolatile storage means. Accordingly, it is possible to deal with a plurality of signature keys without worrying about memory resources of the security device.

Specifically, the present invention provides a security device for restricting multiple uses of signed data, which includes: a nonvolatile storage unit for storing a validity check unit including a counter updated every time signature function means is called up; a volatile storage unit for reading and storing a counter array out of an external nonvolatile storage unit storing the counter array, the counter array being obtained by coupling a hash value generated for each signature key with a signature number counter for counting the number of signatures performed by use of the signature key; and a hash function unit for reading the counter array out of the volatile storage unit, generating the hash value, and transferring the hash value to the validity check unit for a validity check.

The validity check unit may further include key means for assuring validity of the security device, and an immediately preceding hash value among hash values generated in the past and sent from the counter array. Here, the hash function unit further reads a value in the counter and calculates the hash value which is a concatenated value with a value in the counter array. The security device in the present invention includes a unit for comparing the generated hash value with the immediately preceding hash value. Moreover, the security device executes a digital signature in response to a judgment of the validity by the validity check unit, updates a signature number counter, and causes the external nonvolatile storage unit to write an updated value in the signature number counter.

The present invention also provides an information processing device having a function for restricting multiple uses of signed data, which includes: the above-described security device; and an interface unit including a nonvolatile storage unit for storing a counter array configured to couple a hash value generated for each signature key with a signature number counter for counting the number of signatures performed by use of the signature key.

The present invention also provides a controlling method for controlling a security device for restricting multiple uses of signed data. Here, the controlling method causes the security device to execute the steps of: reading a counter array out of an external nonvolatile storage unit and storing the counter array in a volatile storage unit, the external nonvolatile storage unit storing the counter array obtained by coupling a hash value generated for each signature key with a signature number counter for counting the number of signatures performed by use of the signature key; reading the stored counter array for generating the hash value, and transferring the hash value to a validity check unit for a validity check, the validity check unit including key means for assuring validity of the security device and the immediately preceding hash value among hash values generated in the past and sent from the counter array; calling up signature function means in response to a judgment of validity by the validity check unit; and updating a counter every time the signature function means is called up.

In the present invention, the controlling method may further cause the security device to execute the step of storing the immediately preceding hash value among the hash values generated in the past and sent from the counter array. Moreover, in the present invention, the controlling method may further cause the security device to execute the step of allowing the hash function unit to read a value in the counter and to calculate the hash value which is a concatenated value obtained by coupling the counter value with a value in the counter array. In the present invention, the controlling method further causes the security device to execute the step of comparing the generated hash value with the immediately preceding hash value.

Furthermore, in the present invention, the controlling method may further cause the security device to execute the steps of executing a digital signature in response to a judgment of the validity by the validity check unit, updating a signature number counter corresponding to the executing of the digital signature, and allowing the external nonvolatile storage unit to write an updated value in the signature number counter.

Meanwhile, the present invention provides a controlling method for controlling an information processing device having a function for restricting multiple uses of signed data. Here, the controlling method causes the information processing device to execute the steps of: the above-described processing steps; and transferring a counter array from an interface unit including a storage unit for storing the counter array configured to couple a hash value generated for each signature key with a signature number counter for counting the number of signatures performed by use of the signature key, to a security device.

The present invention provides a program capable of implementing a device for executing the above-described controlling methods.

Moreover, the present invention provides a ticketing system using a digital ticket, which includes: a ticket issuer terminal for issuing a ticket; the information processing device for storing the issued ticket; a network for interconnecting the ticket issuer terminal and the information processing device; and a service terminal for issuing a ticket use request to the information processing device. The information processing device may obtain and store the ticket from another information processing device and access the service terminal.

1. Hardware Configuration

FIG. 1 is a view showing a schematic configuration of an information processing system including a security device of the present invention. An information processing system 10 shown in FIG. 1 is configured to include a security device 12, an external device 14, and an interface unit 16 for providing a variety of processing based on a judgment by the security device 12. According to the present invention, the security device 12 controls access to the external device 14 such as a storage device or a computer device through the interface unit 16 by use of a digital signature and a signature number counter for counting the digital signatures. Meanwhile, the interface unit 16 includes an external nonvolatile storage unit 20 configured with a nonvolatile memory provided outside the security device 12. To be more precise, this external nonvolatile storage unit 20 includes a counter array (CA) to be described later in detail. In addition, the information processing system 10 of the present invention may also control access to application software for providing a requested task.

Moreover, as shown in FIG. 1, the security device 12 is generally configured to include a nonvolatile storage unit 22 and a volatile storage unit 24. The nonvolatile storage unit 22 is an area for storing data unique to the security device 12. These storage units may be configured with random access memories (RAMs), flash memories, and the like. Meanwhile, the volatile storage unit 24 is defined as an area for storing transient data of the security device 12. In addition, the security device 12 is equipped with two types of encryption algorithms. One is a unidirectional hash algorithm such as SHA-1. The other is a signature algorithm such as RSA. Of these algorithms, the hash algorithm such as SHA-1 realizes a hash function and the signature algorithm such as RSA realizes a signature function unit.

Figure 2:
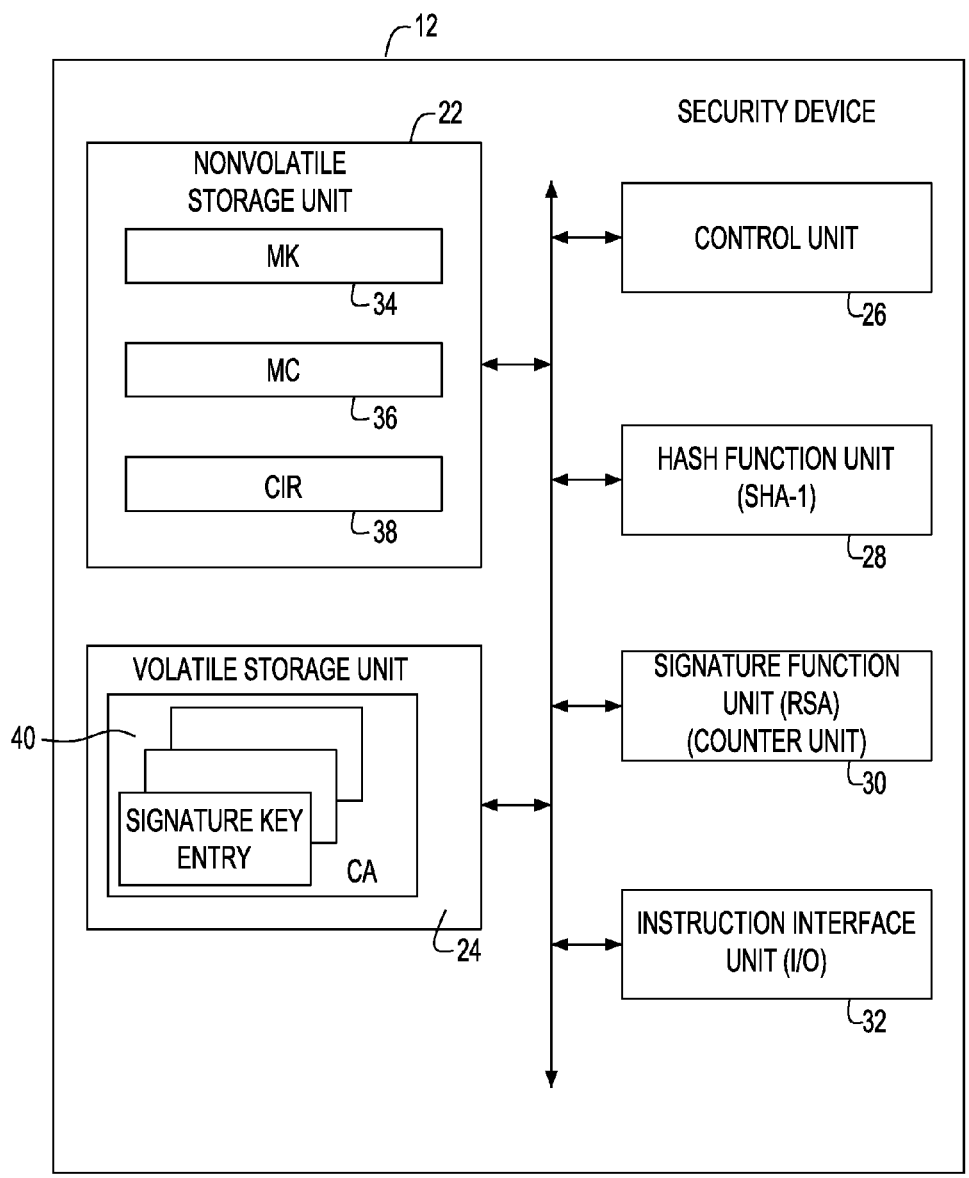
FIG. 2 is a view showing a more detailed functional configuration of the security device of the present invention.

FIG. 2 is a view showing a more detailed functional configuration of the security device 12 of the present invention. As shown in FIG. 2, the security device 12 of the present invention is implemented to include the nonvolatile storage unit 22, the volatile storage unit 24, a control unit 26, a hash function unit 28, and signature function means 30. This signature function means 30 generates data such as private keys or public keys for executing signatures, and executes signatures by using them. In the meantime, the signature function means 30 may be further configured to include a counter unit for counting the number of calls in response to normal calls to a digital signature function to be described later. Meanwhile, in another embodiment of the present invention, the counter unit may be included in another area of the security device 12 instead of the signature function means 30. Moreover, in an embodiment shown in FIG. 2, an instruction interface unit (I/O) 32 is included as a module of the security device 12, which performs intercommunication with the interface unit 16 connected to the outside. In addition, these respective function units are interconnected by an internal bus, thereby communicating data or instructions to one another. The control unit 26 controls the respective storage units and the respective function units according to the present invention so as to prevent fraudulent uses.

The nonvolatile storage unit 22 generally includes a master key (MK) storage unit 34, a master counter value (MC) storage unit 36, and a counter integrity register (CIR) area 38. In this way, the nonvolatile storage unit 22 is highly protected against accesses from the outside. The master key storage unit 34 stores a MK to save a signature key in the outside. The MK stored in the master key storage unit 34 may be a 128-bit AES key, for example, and be used for encrypting a key Blob. Typically, this MK is registered at the time of fabrication and will never be changed for a period corresponding to the lifetime of the security device of the present invention. Meanwhile, the MC storage unit 36 stores a master counter (MC). The MC value is counted up upon receipt of a signal from the counter unit which is outputted in response to an appropriate call to the signature function means. For this reason, when a given signal function is called up and executed, the MC value in the MC storage unit 36 is always changed to a different value.

In addition, the MC value is configured to be increased monotonously in response to execution of any processing using the signature function means executed by the security device 12. For this reason, the MC value provides a fine monitor for calls to the signature function means by the security device 12. In the present invention, the signature function means includes a key generation instruction (genkey), a key deletion instruction (delkey), a signature instruction (sign), and the like, which are programs written in microcode. However, the signature function means are not limited only to the foregoing instructions. The size of the MC storage unit 36 can be set to an appropriate size to avoid the counter from an overflow during the lifetime of the security device 12. To be more precise, the size equal to 32 bits is sufficient for responding to every state change instruction executed every second for a 100 years, for example.

Meanwhile, the MC value is set initially to 0 in the fabrication process, and is incremented when calling up the signature function means and changing the state of the security device. The counter integrity register (CIR) area 38 is defined as a function unit for providing a function to assure the validity of the counter. A value defined by an equation CIR=Hash (MC+CA) is stored in the CIR area 38 as the value thereof (the value will be hereinafter simply referred to as the CIR value). In the above-described equation, the symbol "+" denotes concatenation of character strings.

Moreover, the volatile storage unit 24 temporarily stores data for a counter array (CA) 40 to allow the security device 12 to execute processing of the CA 40. This CA 40 includes data pairs of the hash values of the keys Blob and the values in the signature number counter in the number equal to the number of the signature keys. Accordingly, the data consume the largest part of memory resources from the viewpoint of hardware. For this reason, in the present invention, a signature key list is formed in the external nonvolatile storage unit (not shown) provided outside the security device 12. As a result, the security device 12 can deal with fraudulent uses without concern for constraints of memory resources concerning the number in the signature number counter.

Figure 3:
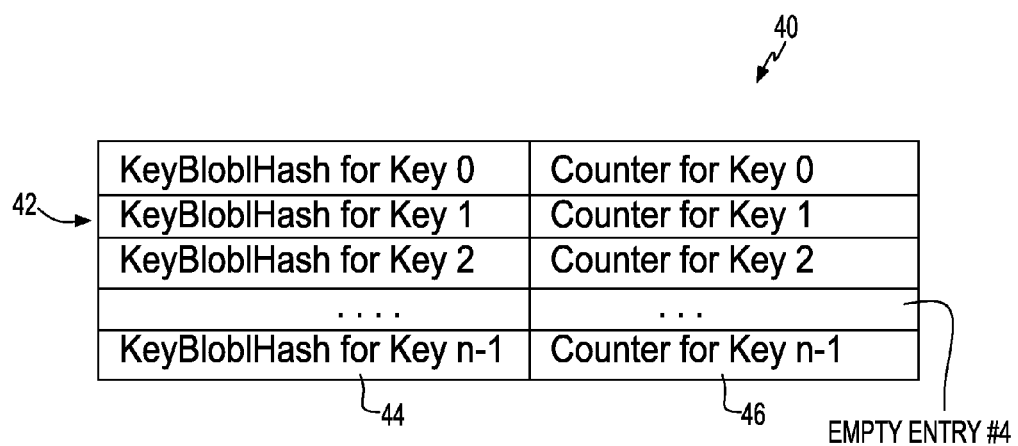
FIG. 3 is a view showing a schematic configuration of a signature key list to be stored in a CA in the present invention.

FIG. 3 is a view showing a schematic configuration of a signature key entry to be stored in the CA 40 in the present invention. As shown in FIG. 3, a signature key entry 42 is designed to include n pieces of data ranging from 0 to n−1 pieces. Each pair subject to entry includes a hash value of the key Blob 44 corresponding to each of the signature keys and a signature number counter 46 relevant to the corresponding key. In the signature number counter 46, a corresponding signature number counter is set to 0 at the point of registration of a new signature key and is incremented every time the signature is executed by use of the corresponding signature key.

Simultaneously, the CA 40 may include use information which indicates as to whether or not a key identification value, e.g. Key 0, is in use. In a certain embodiment of the present invention, in terms of this use information, it is possible to provide an additional bit area and, when a key is not in use, it is possible to indicate that the key is not in use by not setting a use flag in this additional bit area. Meanwhile, in another embodiment of the present invention, it is possible to set a certain counter value such as a value (−1), or to use a hash value of a certain key Blob such as 0×0, for indicating nonuse of a signature key. In this way, it is possible to prevent deletion of unused signature keys due to key deletion function to be described later, by specifying signature keys which are not in use.

The hash value of the key Blob establishes an encrypted reference between the signature key and the signature number counter, and prevents the use of the key Blob having the same key identification value, which has been deleted already. This hash value of the key Blob can be made shorter than a value of a normal unidirectional hash function, such as the 160-bit SHA-1, in response to policy data. To be more precise, it is possible to assume $2^{32}$ keys Blob at the maximum for the entire lifetime of a given security device (because the master counter has a 32-bit length). Accordingly, there is only a very small chance that an arbitrary pair of any of the $2^{32}$ keys Blob have exactly the same lower 64-bit of the hash value thereof. Accordingly, in the present invention, it is conceivable that obtaining a bit count which is twice the bit count of the MC value out of the hash value of the key Blob is almost sufficient for prevention against attacks. However, the length may be either longer or shorter than the foregoing example as hardware resources allow.

2. Updating and Security Mechanisms of CA

Figure 4:
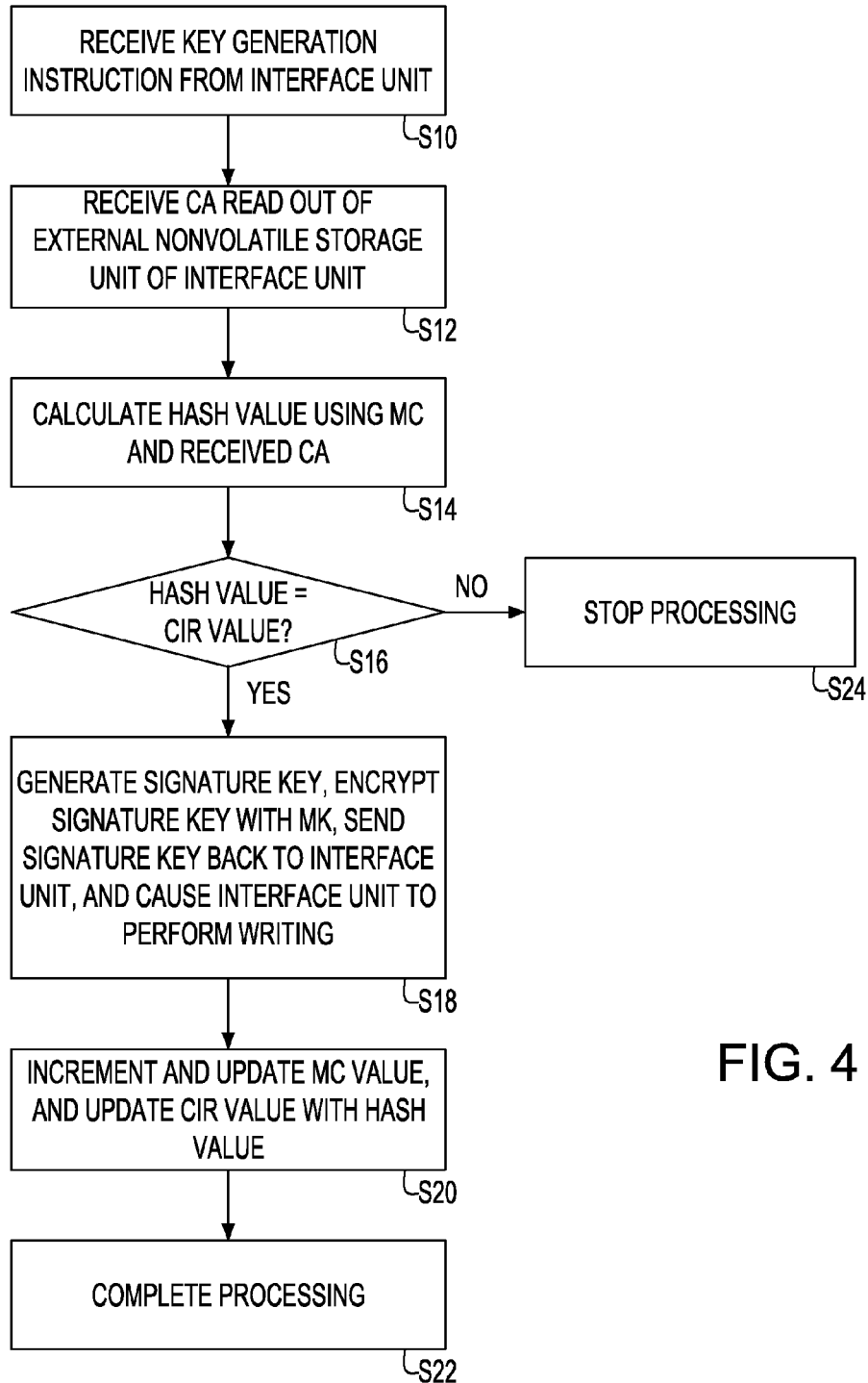
FIG. 4 is a flowchart of processing to be executed by "genkey" for generating a key.

Essentially, updating and security mechanisms of the CA 40 are embodied as events of execution of legitimate calls to key generation (genkey), signature (sign), and key deletion (delkey) made in microcodes, which constitute the signature function means. FIG. 4 shows a flowchart of processing to be executed by the genkey for generating the key. The genkey processing shown in FIG. 4 starts with Step S10 in which the interface unit instructs the security device to generate the key. In Step S12, the interface unit reads the entire entries of the CA out of the nonvolatile storage unit thereof and transfers the entries to the volatile storage unit of the security device. In Step S14, the security device calculates a hash value by use of a MC value and a CA value, and read a CIR value at the same time. In Step S16, the calculated hash value is compared with the CIR value.

As a result of comparison, if the hash value=the CIR value, the CA received by the security device is valid. Accordingly, the processing goes to Step S18 and the signature function means generates signature keys <Ks, Kv> which are encrypted by use of the MK and are returned to the interface unit. Here, the Ks is a private key and the Kv is a public key. Meanwhile, in Step S18, the signature keys generated for the interface unit is written in an unused entry, which is an entry #4 in the embodiment shown in FIG. 3. In this case, the signature number counter on the other part of the pair is set to 0. On the other hand, in Step S20, the security device updates the MC value and simultaneously uses a new CA value to generate a new hash value. Then the security device updates the CIR value as the new has value=CIR value, and terminates the genkey processing in Step S22. On the contrary, if the hash value is not equal to the stored CIR as a result of comparison in Step S16, it is apparent that the CA is changed. Accordingly, the processing goes to Step S24 and the processing is stopped.

Figure 5:
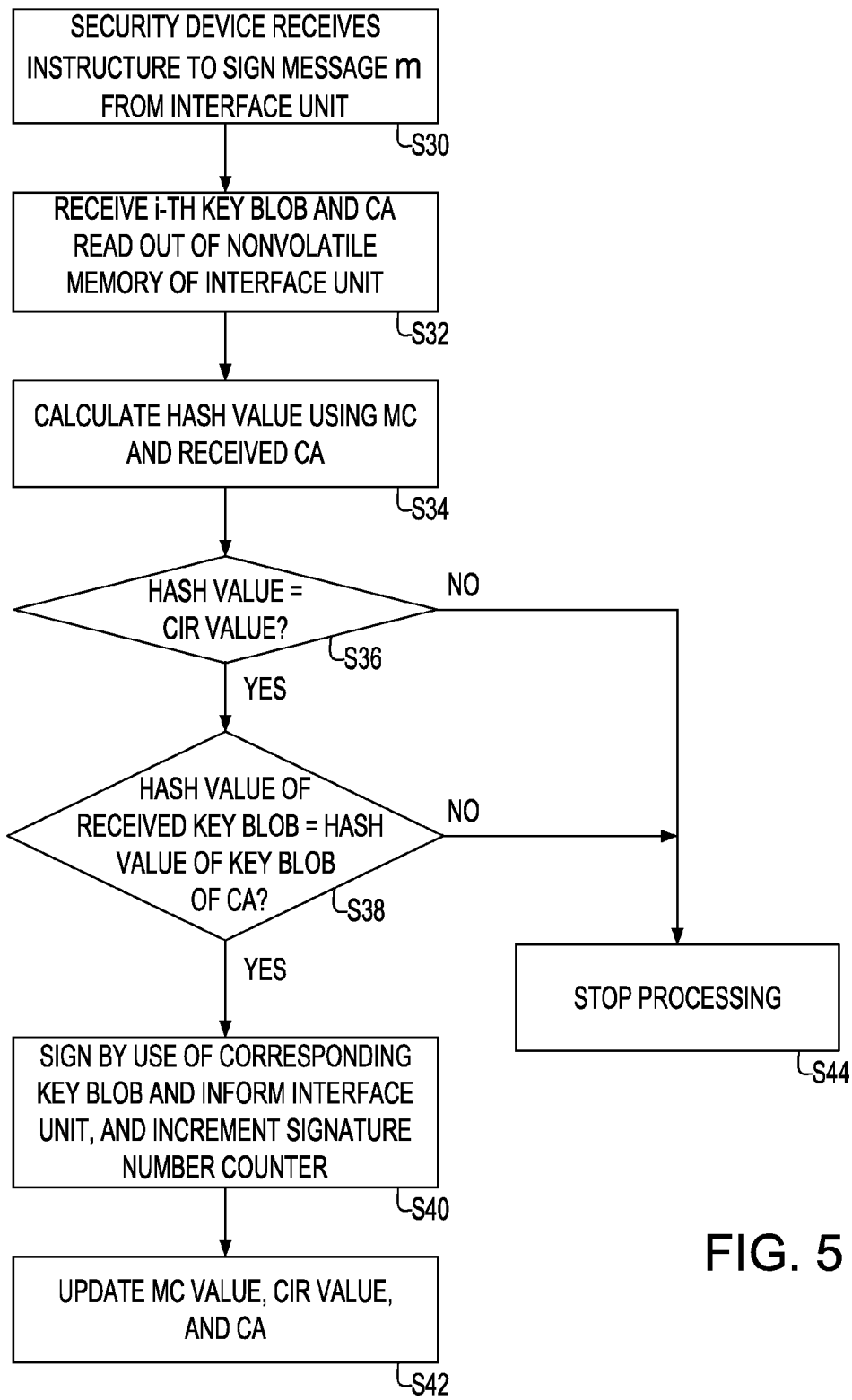
FIG. 5 is a flowchart showing processing to be executed by "sign" for performing a signature in the present invention.

FIG. 5 is a flowchart showing processing executed by sign for performing the signature in the present invention. In this processing, in Step S30, the security device firstly receives an instruction to sign a message m from the interface unit. In Step S32, an i-th (such as fourth, to be more specific) key Blob which is to perform signature and the retained CA are transferred to the security device from the interface unit. In Step S34, the hash value is calculated by use of the MC value and the CA value, and the security device reads the stored CIR value. In Step S36, the calculated hash value is compared with the CIR value. If the hash value=the CIR value, the processing goes to Step S38. Here, the hash value of the transferred key Blob is calculated and is compared with the hash value of the key Blob of the CA. When the hash values are equal, a judgment is made that the CA corresponds to the key. In Step S40, the security device uses the key in the corresponding key Blob and performs a signature on a concatenation of the message m and the value in the signature member counter in the CA. Meanwhile, in Step S40, the interface unit receives the signature and executes an increment to the signature number counter. In Step 42, the security device updates the MC value and the CIR value. Simultaneously, the security device issues an instruction to the interface unit to increment the signature number counter of the corresponding key Blob. On the contrary, in case of a disagreement in the comparison in Step S36 or Step S38, the processing goes to Step S44 and the processing is stopped. According to the sign processing shown in FIG. 5, it is possible to increment the signature number counter safely while maintaining a corresponding relationship between the key Blob and the use counter.

FIG. 6 is a flowchart showing delkey processing for deleting an entry. In the delkey processing, in Step S50, the security device receives an instruction for deleting a key from the interface unit. Simultaneously, the security device receives the CA stored in the nonvolatile storage unit from the interface unit. In Step S52, the security device judges the validity of the CA by use of the above-described processing. In Step S52, when the CA is judged as valid (yes), the processing goes to Step S54 and a corresponding part of the CA is initialized and is stored in the volatile storage unit. In Step S56, the security device calculates the MC and the CIR, and stores the MC and the CIR in the nonvolatile storage unit for updating. Moreover, the security device causes the interface unit to initialize the entry of the corresponding CA, and to store the updated CA in the external nonvolatile unit of the interface unit. When the CA is judged as invalid (no) in Step S52, the delkey processing is branched off to Step S58 and the processing is stopped.

FIG. 7 shows inputs, outputs and the processing of the microcodes for executing the respective processing for the above-described genkey, delkey, and sign. In any type of the processing, the validity of the CA value provided as a parameter is firstly judged by use of the CIR, and the respective processing is executed. Accordingly, when the CA is fraudulently changed, the respective processing is not executed. In this way, it is possible to enhance safety against a fraudulent use. Meanwhile, since the CA is saved in the interface unit in a plain text format, it is possible to make a reference thereto without executing encryption or decryption processing. In this way, it is possible to enhance processing speed.

Furthermore, even if acquisition of the externally registered CA is attempted by a fraudulent access to the CA for executing a signature, the CIR values disagree because the MC values in security modules are different. In this way, it is possible to prevent a fraudulent use. In addition, in terms of a fraudulent access by means of deleting a key and initializing a use counter, the hash values of the key before deletion and of the key Blob are different in the CA. Therefore, it is not possible to execute subsequent processing. In this way, it is possible to prevent a fraudulent use. Meanwhile, even if the interface unit attempts to execute a signature by itself, the key Blob is encrypted by the MK and cannot be decrypted by interface unit. Accordingly, it is possible to prevent a signature by a device other than the security device to a high degree. Moreover, the security device does not encrypt and transfer the CA to the interface unit. Therefore, it is possible to reduce loads on an instruction interface. In the meantime, the interface unit stores the unencrypted CA. Accordingly, it is possible to make a high speed reference to the value in the signature number counter without carrying out decryption processing.

3. Implementation of Security Device (Embodiment)

Figure 8:
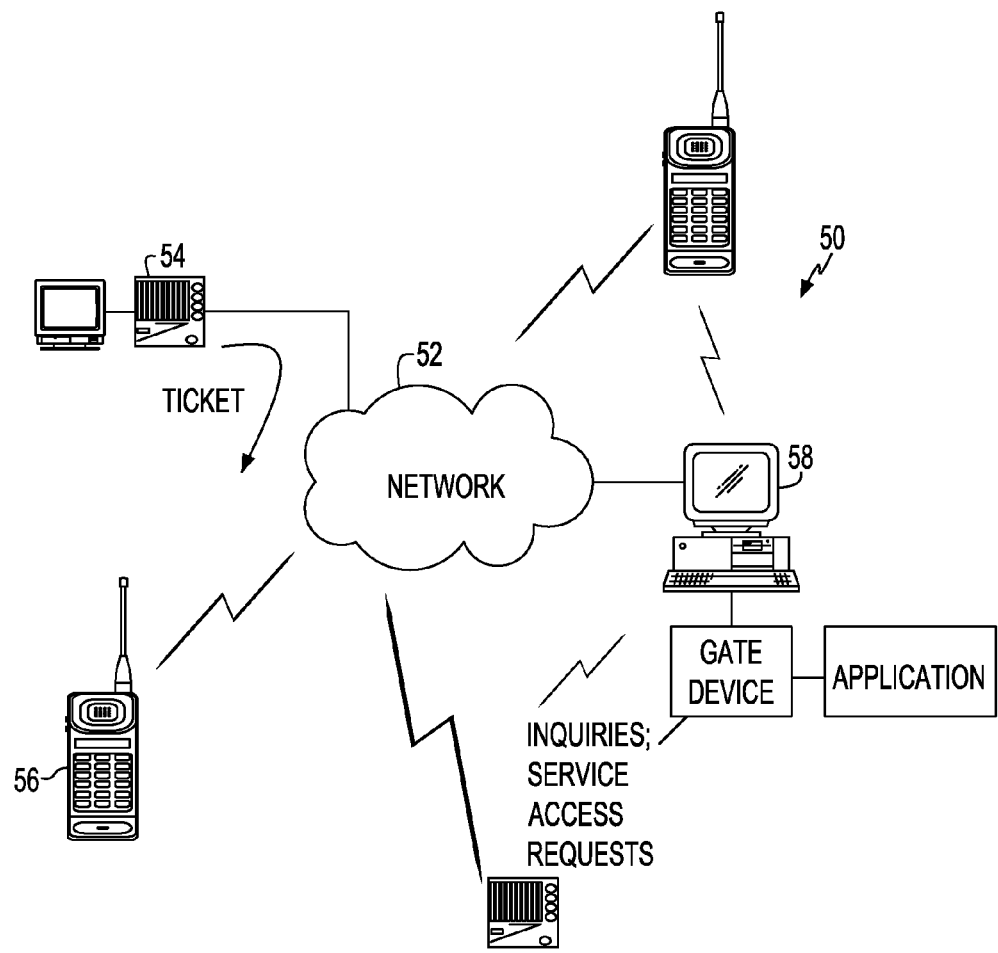
FIG. 8 is a view showing an embodiment of a ticketing system implementing the security device of the present invention.

FIG. 8 shows an embodiment of a ticketing system implementing the security device of the present invention. A ticketing system 50 of the present invention 50 includes a ticket issuer terminal 54 connected through a network 52, a user terminal 56 including the security device of the present invention, and a service terminal 58 capable of data intercommunication with the user terminal 56. In a certain embodiment of the present invention, a ticket issuer may be anyone who is supposed to issue given tickets for certain services, such as an event provider having right of issuing tickets for various events, a service provider providing fee-based information services, or a travel service provider having right of issuing tickets for vehicles, airplanes, trains and the like. Meanwhile, FIG. 8 explains that the service terminal 58 is connected to the network 52. However, in the present invention, it is not necessary to receive information such as a manufacturer key from a certificate authority or the like. Accordingly, it is not always necessary to connect the service terminal 58 to the network 52.

Moreover, the respective terminals 54 and 56 may be any type of previously known information processing devices. To be more precise, the information processing terminals may include personal computers, workstations, cellular phones, PDAs, and the like. Meanwhile, the user terminal 56 may be configured to include an infrared communication function or a barcode display function, for example, and thereby being capable of accessing the service terminal. Moreover, the ticket issuer is provided with a digital signature function for verifying the qualification as the ticket issuer.

Provision and use of a ticket by the ticketing system shown in FIG. 8 will be schematically described below. Firstly, the ticket issuer terminal 54 transmits a given ticket t to the user terminal 56. This ticket t includes content data of the ticket t representing service to be offered, and the like. The user terminal 56 receives this ticket t and stores the ticket t in an appropriate storage area. Meanwhile, the user terminal 56 includes the security device of the present invention, whereby the user terminal 56 is capable of accessing the service terminal 58 through the interface unit. In the meantime, the service terminal 58 receives the signature number counter included in the CA retained in the user terminal 56 together with the message from the user terminal 56, and issues an access permit while making a reference to a maximum signature number Cmax. In this way, the system is configured to deal with a ticket having a number limit.

Figure 9:
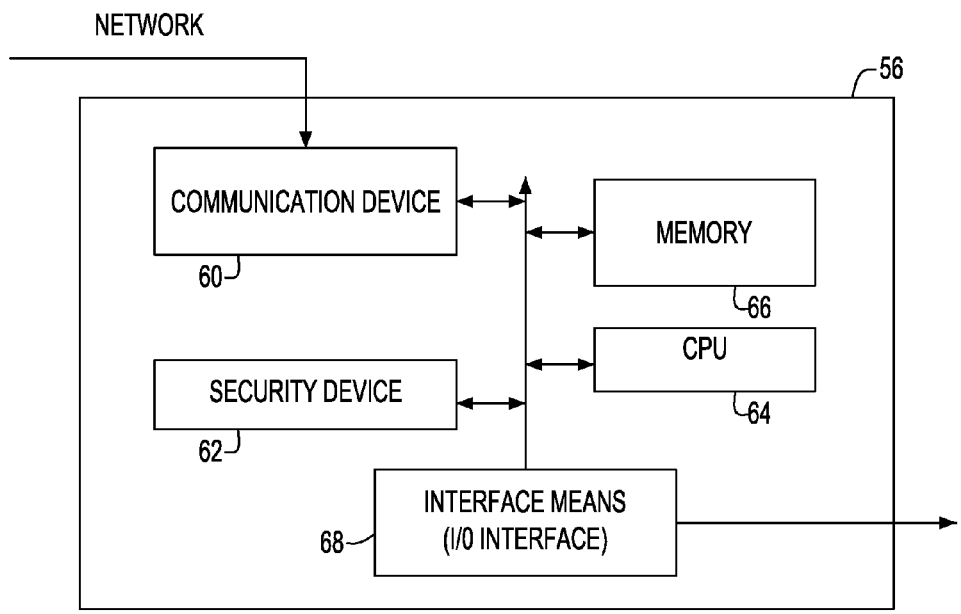
FIG. 9 is a schematic view showing a functional configuration of a user terminal in the ticketing system of the present invention.

FIG. 9 is a schematic view showing a functional configuration of the user terminal 56 in the ticketing system 50 of the present invention. As shown in FIG. 9, the user terminal 56 includes a communication device 60, the security device 62 of the present invention, a central processing unit (CPU) 64 for executing a variety of processing, a memory 66 for storing various data, and an input-output (I/O) interface unit 68. The user terminal 56 receives a message specifying contents of a service from the ticket issuer terminal 54 through the communication device 60. The contents are stored in the memory 66 and are transmitted to the I/O interface unit 68 when the service is desired to be made, so as to be processable by the service terminal 58. This I/O interface unit 68 may be a wireless or infrared communication device, or a unit for displaying a barcode or the like.

Meanwhile, the security device 62 stores a private key master signature key MK used for performing a signature. When receiving a service, the private key master signature key MK is used for performing a signature for verifying that the generated key is generated in the security device 62. In the embodiment described in the present invention, the security device 62 may be formed in a chip. The CPU 64 reads a program for realizing the interface unit used in the present invention out of an appropriate storage area and executes the program. Accordingly, the CPU 64 realizes the I/O interface unit 68 in the user terminal 56. In addition, the I/O interface unit 68 may include an I/O interface function for enabling intercommunication with external devices, or an I/O interface function for displaying a request message as a barcode.

Figure 10:
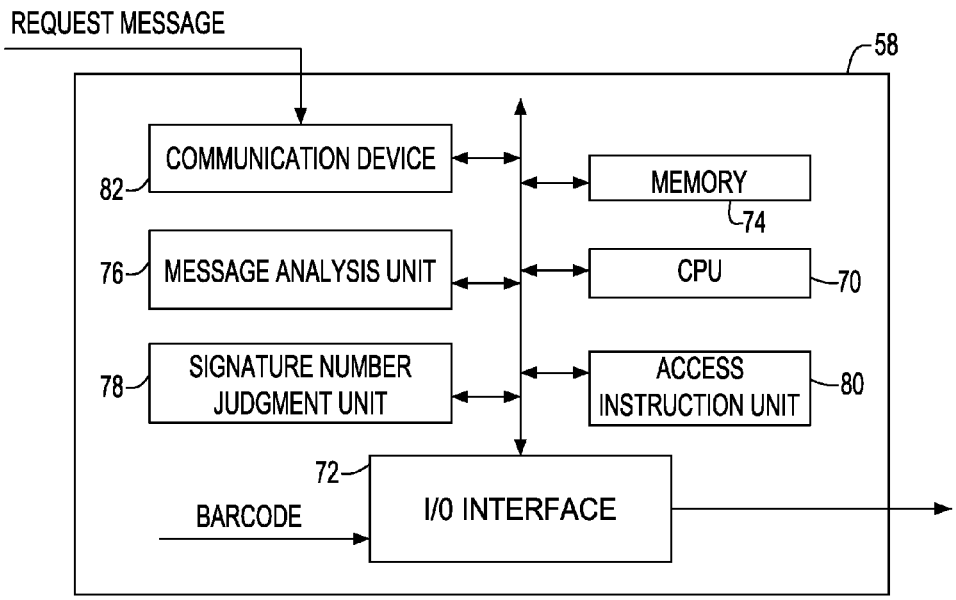
FIG. 10 is a view showing a schematic configuration of a service terminal used in the ticketing system of the present invention.

FIG. 10 shows a schematic configuration of the service terminal 58 used in the ticketing system 50 of the present invention. The service terminal 58 includes a CPU 70, an I/O interface 72, a memory 74, a message analysis unit 76, a signature number judgment unit 78, an access instruction unit 80, and a communication device 82. Although the maximum signature number Cmax may be transmitted from the ticket issuer terminal 54 to the service terminal 58, the service terminal 58 can also receive the maximum signature number Cmax from the user terminal 56 and store the maximum signature number Cmax in the memory 74. When the request message is acquired by the communication device 82 through network, the service terminal 58 analyzes the request message with the message analysis unit 76, specifies the requested service and simultaneously acquires a value C in the use counter transmitted from the user terminal 56 together with the request message, and stores the value C in the memory 74. Thereafter, the signature number judgment unit 78 reads the value C in the signature number counter out of the memory 74 and also makes a reference to the maximum signature number Cmax corresponding to the specified service, whereby the signature number judgment unit 78 judges as to whether the value C in the signature number counter satisfies C≦Cmax.

Meanwhile, in another embodiment of the present invention, when a request message is converted to be displayed in barcode, it is also possible to cause a barcode reader or the like in the service terminal 58 to read the barcode, and to allow the I/O interface 72 to decrypt the barcode into the request message and to execute the analysis of the request message.

Meanwhile, when the validity of the user is judged by use of the request message, the service terminal 58 judges whether C≦Cmax is satisfied. When C≦Cmax is satisfied, the access request does not exceed the maximum signature number. Accordingly, the signature number judgment unit 78 informs the access instruction unit 80 to permit access through the I/O interface 72 to a gate device 84 or to an application 86 managed by the service terminal.

FIG. 11 shows a summary of the processing and parameters used by the security device 62 included in the user terminal 56 used in the ticketing system of the present invention. The generation of a key (genkey) is processing to generate a pair of a private key Ks and a public key Kv and to provide a signature on the public key Kv by use of the master signature key MK. In this case, the use counter C is set to C=0 at the same time. In this case, the CA may be stored in the memory 66 or the like by the interface unit of the user terminal 56 other than the security device 62. Meanwhile, the signature corresponds to the sign processing. Here, a message transmission request for specifying the service is issued by the user terminal 56, whereby the corresponding message is concatenated with the value in the signature number counter, which is provided with the signature by use of the private key Ks. Then, the signature number counter C is incremented by just one.

The deletion of the key (delkey) does not use an input parameter but has a function to delete a designated private key Ks. Here, the MK and the private keys Ks are stored in the security device 62 and are not transmitted to the outside. The numbers of the private keys Ks and signature number counters C do not always have to correspond to the number of the services subject to requests in a proportion of 1:1. It is also possible to set a use counter C for each request message.

Figure 12:
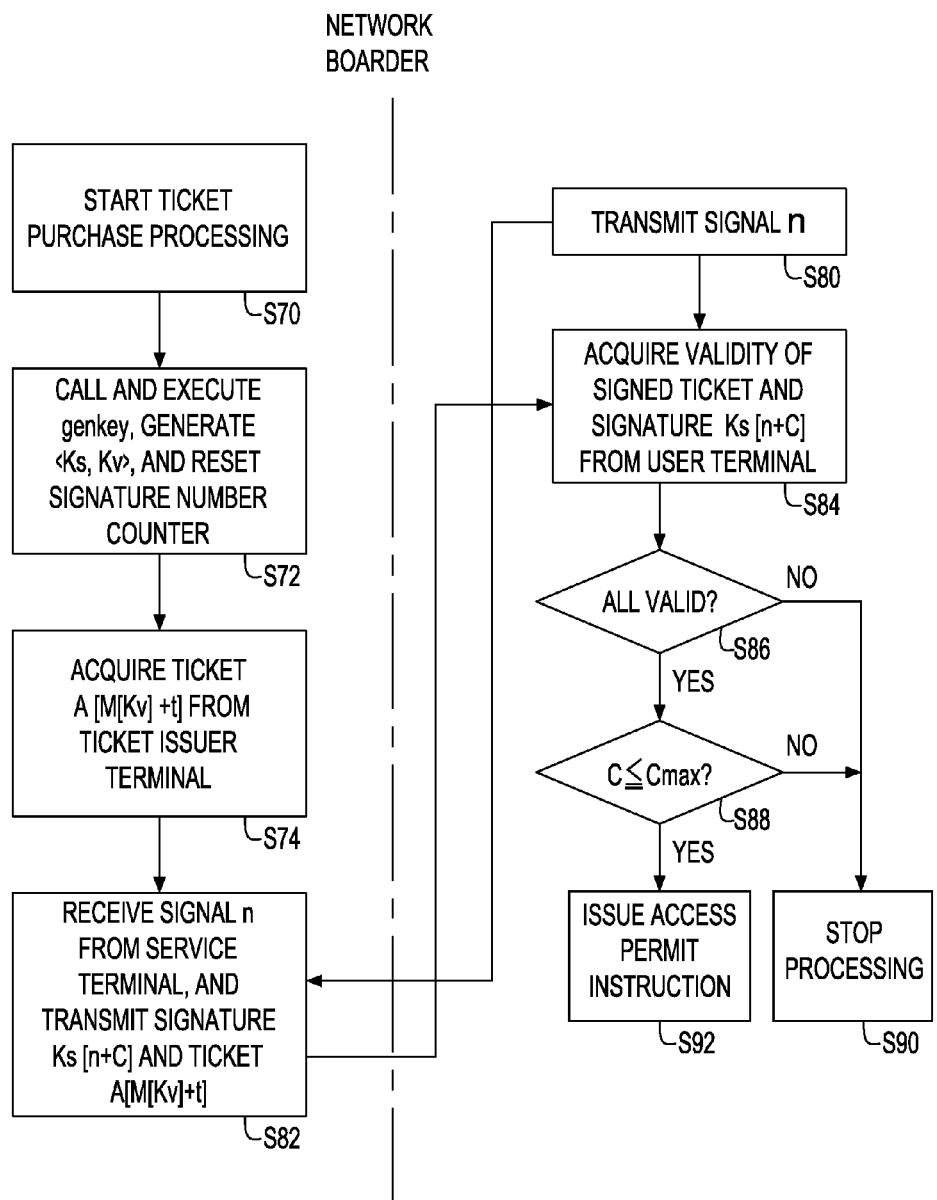
FIG. 12 is a view showing a ticketing protocols to be executed by the ticketing system of the present invention.

FIG. 12 shows ticketing protocols to be executed by the ticketing system 50 of the present invention. In Step S70, the user terminal instructs a processing for obtaining a ticket from the ticket issuer terminal. Then, in step S72, the genkey processing is executed to generate a pair of private and public keys <Ks, Kv>. In this case, the signature number counter is set to 0. The user terminal transmits M[Kv] which is formed by signing the generated public key Kv by use of the master signature key MK in the security device 62, to the ticket issuer terminal. This signature is subjected to inspection, whereby the ticket issuer terminal confirms that the user terminal is a security device made of an authentic chip including the master signature key MK. Thereafter, at the point when the purchase of the ticket is duly completed, a digital ticket A[M[Kv]+t] is transmitted to the user terminal. In the embodiment described herein, the ticket t also includes the Cmax value, which is received by the user terminal at the same time. Here, reference code M denotes the signature executed by the master MK.

In Step S80, the service terminal transmits to the user terminal a signal n for promoting a decision whether to use the ticket t. Here, this signal n may be multicasted to user terminals when the user terminals enter in an effective range by means of intercommunication using a wireless communication function or an infrared communication function having an angular range. In Step S82, the user terminal receives the signal n. When the user terminal uses the ticket, the user terminal starts up the security device and transmits a signature Ks [n+C] and the ticket A [M [Kv]+t] to the service terminal.

In Step S84, to judge the access by the user terminal, the service terminal acquires the ticket content t, validity of the signed ticket A[M[Kv]+t], validity of the signature M[Ks], validity of the signature Ks [n+C] by the user terminal, and the C value. When the validity of the ticket and of the respective signatures is confirmed in Step S86, then a judgment is made as to whether C≦Cmax is satisfied in Step S88. When the judgment is made in Step S88 that C≦Cmax is satisfied (yes), an access permit instruction is issued in Step S92 and permits access by the user terminal. When the C exceeds Cmax in Step S88, the processing is interrupted in Step S90, and the access permit of the user terminal is not issued.

These ticketing protocols are pursued by the security device of the present invention included in the user terminal while executing security checks by use of the master counter value, the CIR value, and the CA value. Accordingly, the ticketing protocol has high safety against imaginable fraudulent uses.

Figure 13:
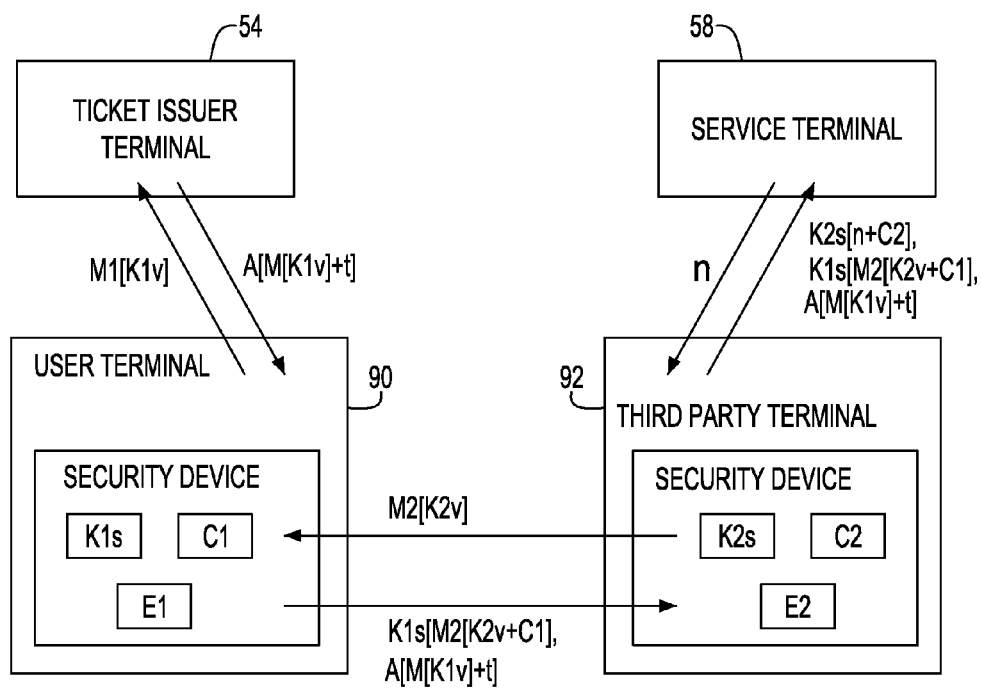
FIG. 13 is a view showing another embodiment of ticketing protocols of the present invention.

FIG. 13 shows another embodiment of ticketing protocols of the present invention. Depending on a business model, it is sometimes preferable to authorize resale of tickets. As shown in FIG. 13, it is possible to resell a ticket between two locations using the same type of security devices (chips) and the same ticketing protocols.

As shown in FIG. 13, the protocols in this embodiment are identical to the protocols described in FIG. 12 to the extent that a user terminal 90 purchases a ticket from the ticket issuer terminal 54. The user terminal 90 transfers the ticket to a third party terminal 92 having the same MK. The third party terminal 92 starts up the security device and generates a key K2s for its own ticket. A safe communication path including two-way authentication means is assumed to exist between the user terminal 90 and the third party terminal 92. The third party terminal 92 transmits a public key K2v corresponding to the K2s to the user terminal 90 together with a signature verifying that the key is derived from an authentic chip.

Meanwhile, when the user terminal 90 and the third party terminal 92 mutually agree with conditions concerning the resale of the ticket including a procedure of payment, the user terminal 90 generates a signature M2[K2v] for the third party terminal 92 by use of its own ticket key K1s, and sends the signature back to the third party terminal 92. At the same time, the user terminal 90 also transfers a ticket signature ticket A[M1[K1v]+t] to the third party terminal 92. The third party terminal 92 verifies that the value of the counter C1 included in this signature is set to 0 proving that this ticket is not used yet.

Next, processing to be executed when the third party terminal 92 uses this ticket will be described. The service terminal 58 transmits the signal n for promoting the use of the ticket to the third party terminal 92. The third party terminal 92 receives this signal n and returns the signal after performing a signature by use of the K2. Simultaneously, the "signature indicating the transfer of the ticket from Bob to Carol" K1s[M2[K2v]+C1], and the ticket A[M1[K1v]+t] in itself, which are received from the user terminal 90, are also transmitted to the service terminal 58. The service terminal 58 confirms that neither of C1 and C2 are equal to Cmax and that the respective signatures are authenticated. It is possible to judge both of a transfer signature K1s[M2[K2v]+C1] by the user terminal 90 and a ticket use signature K2s[n+C2] by the third party terminal 92 based on the respective signature number counters. In this way, it is possible to judge multiple uses of the ticket.

In the above-described embodiment, in order to store a plurality of tickets, a private key and a signature number counter are required for each ticket. For example, assuming that a 1024-bit RSA key is used herein and that a use number counter consumes 1 byte, then each ticket will consume 129 bytes of the nonvolatile memory. To store numerous tickets, it is conceivable that the above-mentioned value will be a large burden from the viewpoint of hardware resources.

A method to solve such a problem is to encrypt the RSA keys and store the RSA keys in an inexpensive external storage device (such as a hard disk drive). The security device is used to store hashes of RSA keys and counters for this purpose. Meanwhile, a master storage key is prepared for use in the entire security device, and such a master storage key can be also stored in the security device. When generating a ticket key, the security device outputs a ticket key encrypted by the master storage key. To use the ticket key, the encrypted ticket key is sent back to the security device. The ticket key can be used after decryption thereof.

The ticket key is usable only inside the security device. Accordingly, it is possible to presume that the ticket key virtually exists in the security device. When use of the ticket key is requested, the security device decrypts the encrypted ticket key and generates a hash thereof. As a result, it is possible to identify which signature number counter the key corresponds to. Accordingly, it is possible to restrict multiple uses by means of incrementing the corresponding signature number counter after performing a signature.

In this embodiment, the master storage key is a 128-bit AES key, for example. It is preferable to provide only a master storage key for the entire security device. Moreover, the ticket key typically includes a 20-byte hash and a 1-byte counter. Accordingly, each ticket will consume 21 bytes of the nonvolatile memory.

The controlling methods of the present invention can be provided in the form of programs capable of implementing a device. Such programs can be written in any of previously known programming languages such as machine languages, the C language, the C++ language, Java (registered trademark), or Applet (registered trademark).

Although the preferred embodiments of the present invention have been described in detail, it should be understood that various changes, substitutions and alterations can be made therein without departing from spirit and scope of the inventions as defined by the appended claims.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A security device configured to restrict multiple uses of signed data, the security device comprising:
    a validity check unit configured to validate a number of signatures, the validity check unit including a counter configured to count the number of signatures validated;
    a nonvolatile storage unit configured to store the validity check unit;
    a volatile storage unit for reading and storing a counter array out of an external nonvolatile storage unit configured to store the counter array, the counter array being obtained by coupling a hash value generated for each of a plurality of signature keys;
    a use flag configured to represent whether each of the plurality of signature keys has been used;
    a signature number counter configured to count a number of signatures by use of one of the plurality of signature key; and
    a hash function unit configured to read the counter array out of the volatile storage unit, generating the hash value, and to move the hash value to the validity check unit for a validity check.

2. The security device according to claim 1, wherein the validity check unit further comprises:
    a key configured to assure validity of the security device; and
    an immediately preceding hash value stored in the counter array.

3. The security device according to claim 2, further comprising:
    a unit for comparing the generated hash value with the immediately preceding hash value.

4. The security device according to claim 1, wherein the hash function unit further reads a value in the counter and calculates the hash value which is a concatenated value with a value in the counter array.

5. The security device according to claim 1, wherein the security device executes a digital signature in response to a judgment of validity by the validity check unit, updates the signature number counter, and causes the external nonvolatile storage unit to write an updated value in the signature number counter.

6. The security device of claim 1, including an interface that has a nonvolatile storage unit configured to store a nonvolatile counter array configured to couple a hash value generated for each signature key with the signature number counter for counting the number of signatures performed by use of the signature key.

7. A computer program product stored on a non-transitory computer storage medium configured to cause a computer to effect the functions of claim 6.

8. A computer program product comprising a computer usable medium stored on a non-transitory computer storage medium configured to cause functions of a security device, comprising computer readable program code configured to cause a computer to effect the functions of claim 1.

9. A controlling method for controlling a security device for restricting multiple uses of signed data, the controlling method causing the security device to execute the steps of:
    reading a counter array out of an external nonvolatile storage unit and storing the counter array in a volatile storage unit, the external nonvolatile storage unit storing the counter array obtained by coupling a hash value generated for each signature key with a signature number counter configured to count the number of signatures performed by use of the signature key;

reading the stored counter array configured to generate the hash value, and configured to move the hash value to a validity check unit for a validity check, and the immediately preceding hash value in the counter array;

transmitting a message requesting a service, wherein the message is concatenated with a value of the signature number counter;

calling up a signature function in response to a judgment of validity by the validity check unit; and updating a counter every time the signature function is called up.

10. The controlling method according to claim 9, further causing the security device to execute the step of:

storing the immediately preceding hash value among the hash values generated in the past and sent from the counter array.

11. The controlling method according to claim 10, further causing the security device to execute the step of:

comparing the generated hash value with the immediately preceding hash value.

12. A ticketing system using a digital ticket, the ticketing system comprising:

a ticket issuer terminal for issuing a digital ticket;

the information processing device according to claim 10 configured to store the issued ticket;

a network configured to interconnect the ticket issuer terminal and the information processing device; and a service terminal configured to issue a ticket use request to the information processing device.

13. The ticketing system according to claim 12, wherein the information processing device obtains and stores the ticket from another information processing device and accesses the service terminal.

14. The controlling method according to claim 9, further causing the security device to execute the step of:

allowing the hash function unit to read a value in the signature number counter and to calculate the hash value which is a concatenated value obtained by coupling the counter value with a value in the counter array.

15. The controlling method according to claim 9, causing the security device to execute the steps of:

executing a digital signature in response to a judgment of the validity by the validity check unit;

updating a signature number counter corresponding to the executing of the digital signature and allowing the external nonvolatile storage unit to write an updated value in the signature number counter.

16. The controlling method of claim 9, including:

transferring a counter array from an interface unit including a storage unit for storing the counter array configured to couple a hash value generated for each signature key with a signature number counter for counting the number of signatures performed by use of the signature key, to a security device.

17. A program stored on a non-transitory computer storage device capable of implementing a device for executing the controlling method according to claim 16.

18. A program stored on a non-transitory computer storage device capable of implementing a device for executing the controlling method according to claim 9.

19. An article of manufacture comprising a non-transitory computer usable storage medium having computer readable program code stored therein configured to control a security device, the computer readable program code configured to cause a computer to effect the steps of claim 9.

20. A program storage device readable by machine, tangibly embodying a program of instructions stored on a non-transitory computer storage medium executable by the machine to perform method steps configured to control a security device, said method steps comprising the steps of claim 9.

* * * * *